Figure 1:
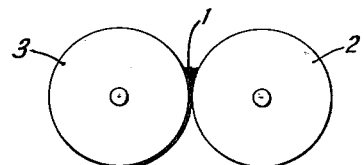
Figure 1:
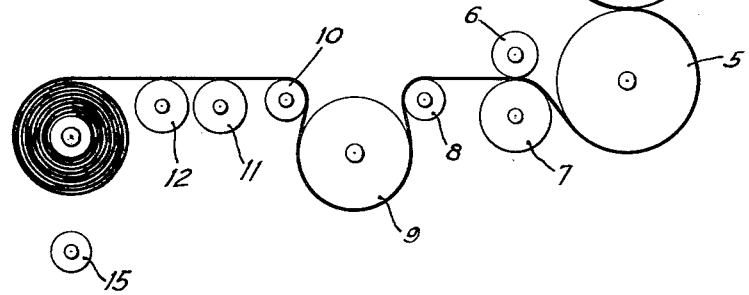

Aug. 21, 1962 V. GIRTANNER 3,050,428
HIGHLY LUSTROUS PLASTIC SHEET MATERIAL
AND A PROCESS OF MAKING SAME
Filed Oct. 5, 1954

INVENTOR.
VIKTOR GIRTANNER
BY
ATTORNEY

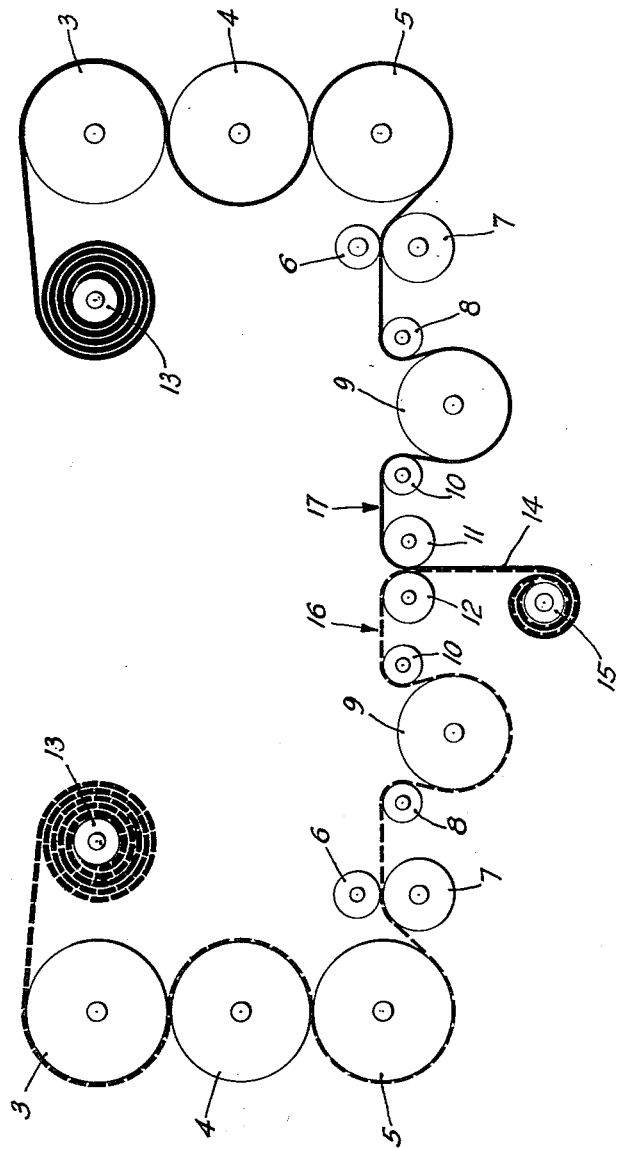

United States Patent Office 3,050,428
Patented Aug. 21, 1962

3,050,428
HIGHLY LUSTROUS PLASTIC SHEET MATERIAL AND A PROCESS OF MAKING SAME
Viktor Girtanner, Lachen, Canton Schwyz, Switzerland
Filed Oct. 5, 1954, Ser. No. 460,420
5 Claims. (Cl. 156—30)

The present invention relates to films, foils and the like sheet material of high luster made of plastics and more particularly to films, foils and the like sheet material of high luster made from thermoplastic material containing vinyl groups and being plasticized by means of suitable plasticizers and to a process of making same.

Heretofore it was not possible to fully retain the high luster and reflective power produced on calendering and drawing films, foils and the like sheet material over a roller imparting to such sheet material a high luster. Usually the high luster or surface purity of such sheet material was considerably impaired by further processing said material and working it up to the final product.

When winding, for instance, such films, foils and other sheet material of high luster in a single layer or with an intermediate layer of tissue paper or the like or when placing such films, foils or other sheet material of high luster layer by layer upon each other whereby intermediate layers of tissue paper may be placed between each layer of plastic material, the reverse side of said film, foil or other sheet material impresses itself after a short period of time, for instance, after about ten minutes upon the front side of said sheet material. Since said reverse side does not have the same mirror-like luster as the front side, the luster of said front side is also considerably reduced even after a short storage period. Likewise, when using intermediate layers of tissue paper, the structure of said intermediate layer impresses itself upon the lustrous surface of said sheet material whereby its luster is also considerably impaired.

Furthermore, on processing said highly lustrous films, foils and other sheet material, for instance, on cutting said sheeting material to size, the lustrous surface is exposed to further impairment caused, for instance, by the action of dust, by fingerprints, by mechanical damage and the like. Scratches may be formed when such sheet material slides, for instance, over a hard support.

Sweating caused, for instance, by migration of the plasticizer, impurities, dull spots and others, may also detrimentally effect the highly lustrous surface of said sheet material.

It is one object of the present invention to prevent all the above mentioned disadvantages, to conserve the high luster of a thermoplastic highly lustrous film, foil and other sheet material during its processing to belts, handbags and other articles without increasing their cost of production, to eliminate the effect of the above mentioned mechanical disturbances, and to avoid any impairment of the quality of the surface of said sheet material due to plasticizer migration.

Another object of the present invention is to provide a simple and effective process of producing films, foils and other plastic sheet material of high luster which allows storage of said sheet material and processing and handling without any danger of impairment to their luster.

Still another object of the present invention is to provide plastic films, foils or other sheet material of high luster which retains its high luster on storage and on further processing.

Other objects of the present invention and advantageous features thereof will become apparent as the description proceeds. In principle, the present invention relates to a process which comprises the step of calendering together a freshly calendered plastic film, foil or other sheet material with another previously calendered film, foil or other sheet material of the same type which preferably is cooled whereby said sheet materials are placed upon each other with their highly lustrous surface, and form a semimanufactured material. On further processing said semimanufacture to finished goods, the two films, foils or other sheet material are now pulled apart from each other and are thus separated. By this process, the highly lustrous surface of the plastic film, foil or other sheet material is protected against any external influence regardless whether said double films, foils or other sheet materials are wound to form rolls or whether they are placed upon each other in the shape or size to which they were previously cut.

The two-ply films, foils or other sheet material produced in this manner furthermore do not contain any air occlusions. They can be readily pulled and separated from each other manually.

The above described process according to this invention has, among others, the advantages that Sweating of the plasticizer and dull spots caused thereby are avoided, since migration of the plasticizer cannot affect the highly lustrous surfaces on account of their intimate contact with each other and Attraction and adhesion of dust to the highly lustrous surface due to electrical charges does not occur.

The new process is especially suitable for plastified thermoplastic materials of the vinyl type, such as polyvinyl chloride and mixed polymerization products of vinyl chloride and other components, such as vinyl acetate and acrylic acid esters, and of mixtures of polyvinyl chloride with such mixed polymerization products. Highly lustrous films, foils and other sheet material of this type are produced, for instance, on a drawing calender. An especially brilliant mirror-like luster is obtained, for instance, by passing such films, foils or sheet material in the thermoplastic state between a chromium-plated roller of high luster and a suitable counter roller. Highly lustrous sheet material is also produced by pressing films, foils or other sheet material of normal surface between highly lustrous metal sheets placed in a multi-layer hydraulic press or the like plate press.

Figure 2:
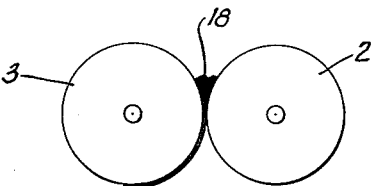
Figure 2:
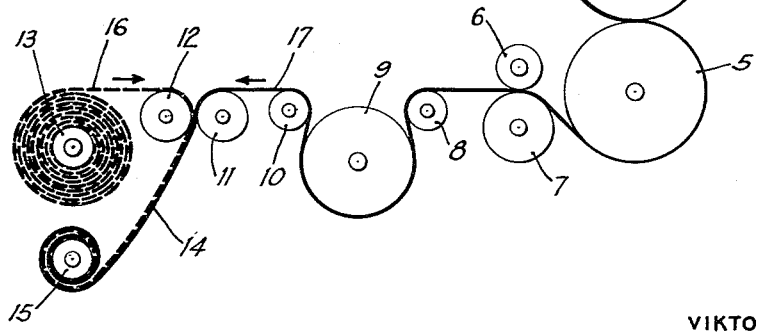

A two-ply film, foil or other sheet material according to the present invention is obtained by proceeding as follows:

The attached drawing illustrates the apparatus used for producing such highly lustrous two-ply films, foils, or other sheet material. In said drawing FIG. 1 illustrates diagrammatically the process of producing a highly lustrous film, foil, or other sheet material, cooling, and winding said sheet material on a prewinding reel while FIG. 2 illustrates diagrammatically the process of calendering together the prewound highly lustrous film, foil, or other sheet material and another highly lustrous film, foil, or other sheet material after calendering and cooling the same. In said FIGS. 1 and 2, like reference numerals are applied to like parts and devices of said apparatus.

The plastic material 1, for instance, polyvinyl chloride, is placed between two heated rollers 2 and 3 of which roller 2 is heated, for instance, to 180° C. and roller 3 to 140° C. The thermoplastic material 1 is drawn through said first pair of calender rollers 2 and 3 and is conducted in sheet form through calender roller 3 heated to 140° C. and calender roller 4 heated to 165–170° C. Thereafter it is passed through calender rollers 4 heated to 165–175° C. and calender roller 5 heated to 175–185° C. The resulting film, foil, or other sheet material is then conducted to the device imparting a highly lustrous surface on one side to said sheet material. Said device consists of highly polished chromium-plated roller 6 and rubber roller 7 forcing said sheet material against said roller 6 and thereby producing a highly lustrous surface on said sheet material. The highly lustrous sheet material is then conducted to guide roller 8 and is caused to contact with its highly lustrous surface cooling roller 9 from which the cooled thermoplastic material is guided over two calendering rollers 11 and 12 to smooth, polished roller 13 upon which it is wound. After a certain length of film, foil, or other sheet material 16 of highly lustrous surface, has been wound upon said prewinding roller 13 said sheet material is cut on passing calendering rollers 11 and 12.

The sheet material 16 wound upon said prewinding roller 13 is then unwound in reverse direction towards and upon calendering roller 12, as shown in FIG. 2. There it meets freshly calendered and cooled sheet material 17 which is guided towards and upon calendering roller 11 and which has passed as thermoplastic starting material 18 through heated drawing calendering rollers 2, 3, 4, and 5, through luster imparting rollers 6 and 7, by means of guide roller 8 along cooling roller 9 and finally by means of guide roller 10 toward said calendering roller 11. Both foils, films, or other sheet materials 16 and 17 run together so that the highly lustrous surface of sheet material 16 comes in contact with the highly lustrous surface of sheet material 17. Rollers 11 and 12 preferably consist of rubber or similar material with a smooth surface. The diameter of said rollers is preferably less than 15 cm. The gap formed between said rollers is of such a small width that the two foils, films or other sheet material are calendered together the moment their highly lustrous surfaces contact each other. Said calendering causes good adhesion of both sheet materials upon each other whereby any occlusion of air which might have a disturbing effect upon the luster of said sheet materials is avoided.

Preferably calendering rollers 11 and 12 are arranged between prewinding roller 13 and cooling roller 9 at about the same height as said rollers 13 and 9. In this manner prewound sheet material 16 arrives with its lustrous surface in upward direction and from the left side and running up sheet material 17 also with its lustrous surface in upward direction and from the right side towards the roller gap of the pair of calendering rollers 11 and 12 and enter said gap from above. The co-calendered two-ply sheet material 14 leaves said pair of rollers in downward direction and is immediately wound upon cardboard spool or winding roller 15.

As soon as prewound foil, film, or sheet material 16 has been unwound and run off from roller 13, the following foil, film, or sheet material is again passed over said calendering rollers 11 and 12 onto prewinding roller 13 and is wound thereon as shown in FIG. 1. The length of said prewound single foil, film, or other sheet material 16 wound upon said roller 13 may vary considerably. It should, however, in no case be so long that the luster of the highly lustrous surface is impaired by contact with its reverse side. Of course, the prewound foil, film, or other sheet material 16 must be unwound and calendered together with the film, foil, or other sheet material 17 to form two-ply film, foil, or sheet material 14 within such a short period of time that its lustrous surface is not affected by contact with its reverse side.

It is also possible to separately impart high luster to the plastic film, foil, or other sheet material and to separately calender together two such highly lustrous films, foils, or other sheet materials. This embodiment of the present invention consists in first winding in the conventional manner the two sheet materials 16 and 17 separately upon prewinding roller 13 as shown for sheet material 16 in FIG. 1.

Said prewound sheet materials are then calendered together by passing them from opposite ends through an apparatus illustrated diagrammatically in FIG. 3.

In said apparatus, the prewound sheet materials 16 and 17 are unwound from rollers 13 and subjected to a heat treatment by passing them between heated rollers 3, 4, and 5 heated, for instance, to temperatures of 140° C., 165–175° C. and 175–185° C., respectively. The heated sheet materials are then passed through high luster imparting rollers 6 and 7 and by means of guide rollers 8 around cooling rollers 9 over guide rollers 10 between calendering rollers 11 and 12. The sheet material calendered together by said rollers 11 and 12 form two-ply film, foil, or other sheet material 14 which is wound upon spool or roller 15.

This mode of operation permits the use of foils, films, or other sheet material of high luster which has been stored for some time in the conventional manner. By said heat treatment followed by a luster imparting treatment such sheet material can be converted into two-ply sheet material, and, thus, its high luster can be conserved for any length of time.

I claim:
1. In a process of producing a two-ply sheet material of a thermoplastic synthetic resin, said sheet material being readily separable into two sheets, each of said two sheets having a surface of high luster, the steps comprising placing upon each other two sheets of a thermoplastic synthetic resin of substantially the same composition, each of said sheets having a surface of high luster, and at least one of said surfaces of high luster being provided immediately before such placing operation in face to face contact of said highly lusterous surfaces and exposing said superposed two sheets without application of heat to a pressure sufficient to unite said two sheets to a readily separable two-ply sheet, but insufficient to substantially reduce the high luster of said surfaces upon separation of said sheets from each other.

2. In a process of producing a two-ply sheet material of a thermoplastic synthetic resin, said sheet material being readily separable into two sheets, each of said sheets having a surface of high luster, the steps comprising calendering together two sheets of a thermoplastic synthetic resin of substantially the same composition, each of said sheets having a surface of high luster and at least one of said surfaces of high luster being provided immediately before such calendering operation, in face to face contact of said highly lustrous surfaces and exposing said superposed two sheets without application of heat during calendering to a pressure sufficient to unite said two sheets to a readily separable two-ply sheet, but insufficient to substantially reduce the high luster of said surfaces upon separation of said sheets from each other.

3. In a process of producing a two-ply sheet material of a thermoplastic synthetic resin, said sheet material being readily separable into two sheets, each of said sheets having a surface of high luster, the steps comprising placing upon each other two sheets of a thermoplastic synthetic resin of substantially the same composition, said resin being selected from the group consisting of polyvinyl chloride, copolymerization products of vinyl chloride and vinyl acetate, copolymerization products of vinyl chloride and acrylic acid esters, and mixtures of polyvinyl chloride with said copolymerization products, each of said sheets having a surface of high luster and at least one of said surfaces of high luster being provided immediately before such placing operation, in face to face contact of said highly lustrous surfaces and exposing said superposed two sheets without application of heat to a pressure sufficient to unite said two sheets to a readily separable two-ply sheet but insufficient to substantially reduce the high luster of said surfaces upon separation of said sheets from each other.

4. In a process of producing a two-ply sheet material of a thermoplastic synthetic resin, said sheet material being readily separable into two sheets, each of said sheets having a surface of high luster, the steps comprising calendering together two sheets of polyvinyl chloride resin of substantially the same composition, each of said sheets having a surface of high luster and at least one of said surfaces of high luster being provided immediately before such calendering operation, in face to face contact of said highly lustrous surfaces and exposing said superposed two sheets without application of heat during calendering to a pressure sufficient to unite said two sheets to a readily separable two-ply sheet, but insufficient to substantially reduce the high luster of said surfaces upon separation of said sheets from each other.

5. In a process of producing stable sheets and foils of thermoplastic polymerization products, having a surface of high luster, the steps comprising hot-calendering a sheet of said thermoplastic polymerization product, passing the sheet through a pair of rollers imparting thereto a highly lustrous surface, said pair of rollers consisting of a high-polished roller and a pressure roller forcing the sheet against the high-polish roller, and conducting the resulting sheet having a high luster surface over cooling rollers, and, together with another sheet of substantially the same thermoplastic polymerization product, said sheet having a high luster surface and prepared in the same manner, in face to face contact of their high luster surfaces through a pair of cold pressure rollers, at a pressure sufficient to unite said two sheets to a readily separable two-ply sheet, but insufficient to substantially reduce the high luster of said surfaces upon separation of said sheets from each other.

References Cited in the file of this patent

UNITED STATES PATENTS

| | | |
|---|---|---|
| 2,067,025 | Schmidt | Jan. 5, 1937 |
| 2,434,541 | Bierer | Jan. 13, 1948 |
| 2,453,052 | Etten | Nov. 2, 1948 |
| 2,529,884 | Reynolds | Nov. 14, 1950 |
| 2,536,773 | Saidel | Jan. 2, 1951 |
| 2,679,968 | Richter | June 1, 1954 |
| 2,679,969 | Richter | June 1, 1954 |
| 2,700,630 | Bukey et al. | Jan. 25, 1955 |

FOREIGN PATENTS

| | | |
|---|---|---|
| 841,794 | Germany | June 19, 1952 |